March 14, 1933. T. T. GRAY 1,901,158
REFINING HYDROCARBONS
Filed July 29, 1930
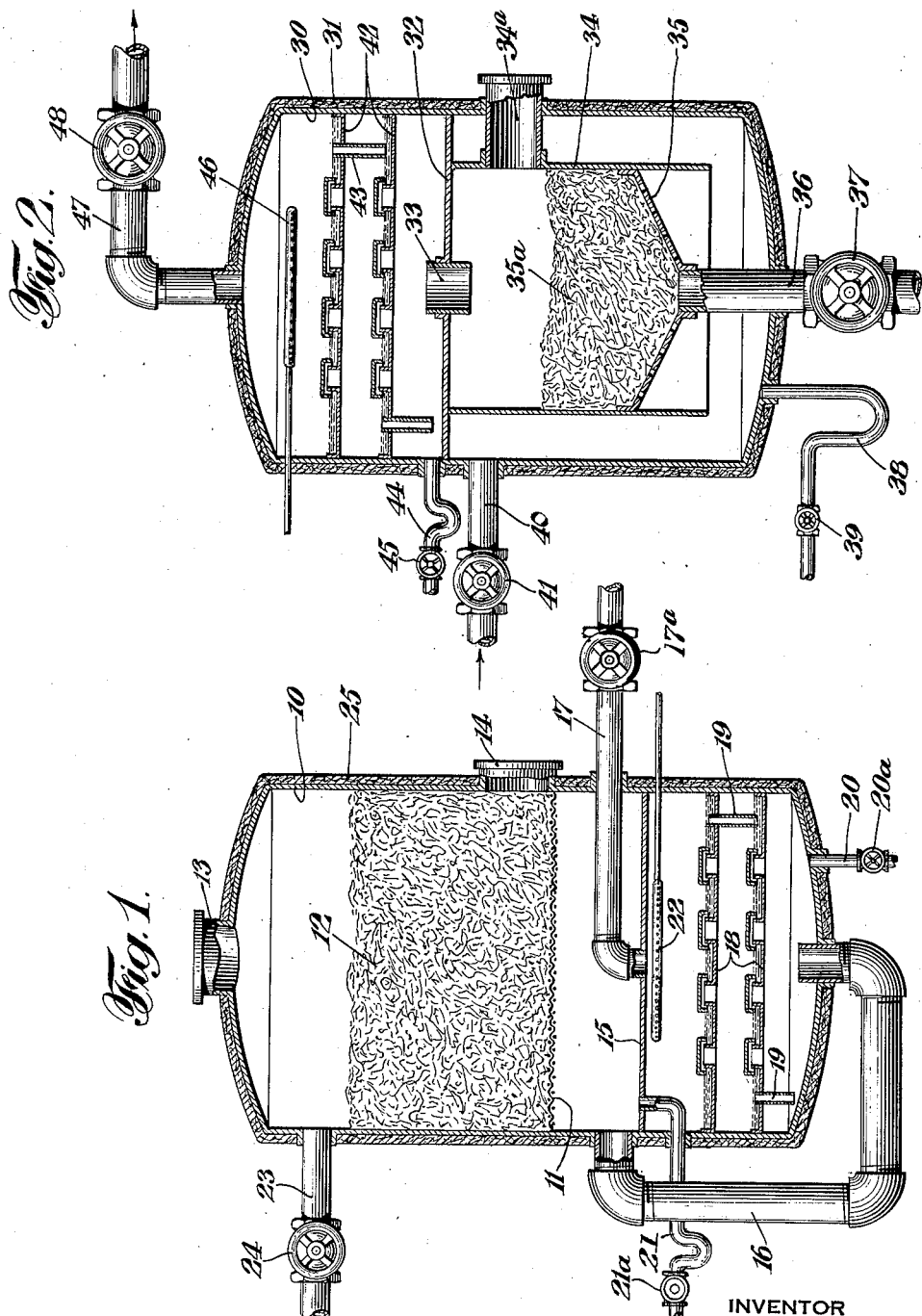
INVENTOR
Thomas T. Gray
BY
Kenyon & Kenyon
ATTORNEYS Patented Mar. 14, 1933

1,901,158

UNITED STATES PATENT OFFICE

THOMAS T. GRAY, OF ELIZABETH, NEW JERSEY, ASSIGNOR TO THE GRAY PROCESSES CORPORATION, OF NEWARK, NEW JERSEY, A CORPORATION OF DELAWARE

REFINING HYDROCARBONS

Application filed July 29, 1930. Serial No. 471,454.

This invention relates to the art of refining hydrocarbons and more especially to the vapor phase refining of cracked petroleum products by contact with adsorptive materials.

In a method of vapor phase refining of cracked petroleum products, the products are caused to pass through a body of solid adsorptive material supported within a treating tower for free drainage. During the contacting step, polymerization of unstable, unsaturated hydrocarbons contained in the vapors takes place. The polymers thus formed have a higher boiling point than the remaining vapors and consequently as the vapors being treated are maintained at or near their boiling point under the conditions of treatment, the polymers liquefy in the treating material and are separated from the treated vapors. The vapors to be treated are supplied either from a re-run still where the cracked products are re-distilled or directly from a cracking unit. In either case, it is advisable to interpose a fractionating tower between the distilling system and the treating tower so that only that fraction which is desired in the final refining product is passed through the adsorptive material. The adsorptive material most common in commercial use is fullers' earth, although other adsorptive material having similar selective polymerizing qualities may be used.

It has been found that the efficiency of the refining process and the quality of final product are improved by adding a fractionating step after the refining or polymerizing step. Heretofore, this has been accomplished by introducing between the treating tower and the condenser used for condensing the treated vapors, a secondary fractionating tower usually of the bubble cap type. By passing the treated vapors through such a tower any polymers entrained in the vapor are removed and improvement in quality is obtained by refluxing the liquid collecting in such secondary fractionating tower.

The use of a secondary fractionating tower, however, has several disadvantages. First, it adds to the expense of the equipment where as is usual in the case of a treating tower directly connected to a cracking unit, the operation is carried on under considerable pressure and the secondary fractionating tower has to be built to withstand such pressure. Second, there is a larger heat loss in the secondary tower than is necessary for the amount of separation it is usually desired to accomplish. Finally, due to this heat loss, it is difficult to properly regulate the amount of reflux which contacts with the vapors and which during normal operation should be kept very low.

This invention has for an object a combined treating tower and secondary fractionating tower which obviate the disadvantages above enumerated.

Other objects, novel features and advantages of this invention will be apparent from the following specification and accompanying drawing, wherein:

Fig. 1 is a vertical section through one form of apparatus embodying the invention, and Fig. 2 is a vertical section through a modified form of apparatus embodying the invention.

The treating tower 10 is provided with a screen or shelf 11 on which is supported for free drainage a body of treating material 12 which may be fuller's earth, or any solid adsorptive material capable of causing polymerization of unstable, unsaturated compounds present in cracked hydrocarbons. The tower 10 is provided with a charging manhead 13 and a discharging manhead 14 by means of which the treating material is introduced into and removed from the treating tower.

A solid partition 15 divides the tower into upper and lower compartments, the upper compartment containing the shelf 11. A pipe 16 connects the lower part of the upper compartment with the lower part of the lower compartment and an outlet pipe 17 controlled by valve 17ª leads off from the upper part of the lower compartment. Within the lower compartment are provided bubble trays 18 and conductors 19 such as are commonly used in fractionating columns for insuring contact between liquids and vapors. A drainage pipe 20 controlled by valve 20ª leads from the bottom of the tower and serves to remove liquid from the lower compartment and a pipe 21 controlled by valve 21ª is provided to drain liquid from the upper compartment. In the upper part of the lower compartment near the outlet pipe 17 there is provided a coil 22 through which a cooling fluid may be circulated or which may be perforated to spray liquid into the compartment.

A vapor inlet pipe 23 controlled by the valve 24 communicates with the upper portion of the upper compartment of the tower. The entire tower is preferably surrounded with a layer 25 of suitable heat insulating material.

In the operation of this apparatus, the vapor inlet 23 is connected with a source of cracked hydrocarbon vapors which may be a fractionating tower connected to a cracking still or to a re-run still. The vapor outlet 17 is connected to a condenser (not shown) for cooling and condensing refined vapors. The drainage pipes 20 and 21 may be connected to a tank or the effluent liquid may be pumped back into the fractionating tower of the distilling system or to any other part of the system for re-treatment.

The vapors entering the upper compartment pass through the solid adsorptive material 12, thereby causing polymerization of the unstable, unsaturated constituents of the vapors to higher boiling point compounds which condense and drain through the screen 11 along with the vapors. The vapors are conducted from the upper compartment through the pipe 16 into the lower compartment in which they rise through the trays and bubble caps and are contacted with liquid reflux either produced from the treated vapors by condensation caused by cooling fluid in the coil 22 or introduced through perforations in the coil. In their passage through the trays and bubble caps, the refined vapors are separated from any polymers with which they might otherwise be contaminated. By proper regulation of the reflux liquid the vapors are held within any desired boiling range. The polymers and other condensates collecting in the compartments are removed by the pipes 20 and 21 and are disposed of as above indicated. The refined vapors are conducted through the outlet pipe 17 to the condenser above mentioned.

Referring now more especially to Fig. 2 a treating tower 30 is provided with a layer 31 of suitable heat insulating material. A partition 32 divides the tower into upper and lower compartments between which communication is provided by a passage 33. A cylindrical partition 34 is supported at its upper end from the horizontal partition 32 and the lower end thereof terminates a short distance above the bottom of the tower. Within the cylindrical partition 34 is provided a substantially funnel-shaped perforated shelf terminating in a discharge spout 36 controlled by a valve 37. The shelf 35 supports for free drainage a body of treating material 35ª which may be fuller's earth or any solid adsorptive material capable of polymerizing the unstable, unsaturated hydrocarbons present in cracked hydrocarbons. A drainge pipe 38 controlled by a valve 39 leads from the bottom of the lower chamber. A manhead 34ª is provided for charging the treating material into the chamber formed by the partition 34 and shelf 35 and the pipe 36 provides means for discharging such treating material after it has become spent. A vapor inlet 40 controlled by a valve 41 leads into the upper portion of the annular space between the partition 34 and the tower wall.

The upper compartment is provided with bubble trays 42 and conductors 43 such as are commonly used in fractionating columns for insuring contact between liquids and vapors. A drainage pipe 44 controlled by valve 45 leads from the bottom of the upper compartment. In the upper portion of the upper compartment there is provided a coil 46 through which cooling fluid may be circulated or which may be provided with perforations to permit spraying liquid into the upper chamber. A vapor outlet pipe 47 controlled by the valve 48 leads to a condenser (not shown).

In this apparatus, the vapor inlet 40 connects with a source of cracked hydrocarbon vapors which may be a fractionating tower connected to a cracking still or to a re-run still. The vapor outlet 47 is connected to a condenser (not shown) for condensing and cooling refined vapor. The draw-off lines 38 and 44 may be connected to a tank or the effluent liquid may be pumped back to the fractionating tower of the distilling system or to any other part of the system for re-treatment.

The vapors entering the annular space in the lower compartment pass downwardly and under the lower edge of the partition 34 and then upwardly through the treating material thereby causing polymerization of the unstable, unsaturated constituents of the vapors to higher boiling point compounds which condense and drain through the shelf 35 into the bottom of the lower compartment. The vapors then pass through the passage 33 into the upper compartment. Here they come in contact with reflux liquid either introduced as such through the coil 43 which in that case is perforated or produced by condensation of the vapors in contact with the coil which may be cooled by the circulation of cooling medium therethrough. The vapors pass upwardly through the bubble trays and caps and escape through the outlet pipe 47 to the condenser. The polymers draining from the treating material, together with condensate from the fractionating column are conducted through the pipes 38 and 44 to a tank or are returned to a previous part of the system for re-treatment. The treating material is preheated by the circulation of the vapors around the partition 34 prior to their passage through the treating material and some of the higher boiling vapors are condensed and are collected in the bottom of the shell.

In both of the modifications above described, the fractionating column and treating tower are combined within one shell, thus avoiding the use of additional equipment which entails added expense from the standpoint of construction and erection and eliminates the heat losses due to radiation.

I claim:

1. In an apparatus of the character described, a shell, a partition dividing said shell into two compartments, a passage connecting said compartments, means in one compartment for supporting solid adsorptive material for free drainage, a vapor inlet for said last mentioned compartment, a fractionating column contained within said other compartment, and a vapor outlet from said last compartment.

2. In an apparatus of the character described, a shell, a partition dividing said shell into two compartments, a passage connecting said compartments, means in one compartment for supporting solid adsorptive material for free drainage, a vapor inlet for said last mentioned compartment, a fractionating column contained within said other compartment, a vapor outlet from said last compartment, and means for draining liquid from said compartments.

3. In an apparatus of the character described, a shell, a partition dividing said shell into two compartments, a passage connecting said compartments, means in one of said compartments for supporting solid adsorptive material for free drainage, a vapor inlet for said compartment, a fractionating column contained within the other compartment, a vapor outlet from said last compartment, and means for supplying reflux liquid to the upper portion of said fractionating column.

4. In combination, an upright shell, a horizontal partition dividing said shell into upper and lower compartments, means in one compartment for supporting solid adsorptive material for free drainage, a vapor inlet for said compartment, a fractionating column contained within the other compartment, a passage leading from said first compartment to the lower portion of the second compartment, and a vapor outlet from said second compartment.

5. In combination, an upright shell, a horizontal partition dividing said shell into upper and lower compartments, means in one compartment for supporting solid adsorptive material for free drainage, a vapor inlet for said compartment, a fractionating column contained within the other compartment, a passage leading from said first compartment to the lower portion of the second compartment, a vapor outlet from said second compartment, and means for supplying reflux liquid to the upper portion of said second compartment.

6. In an apparatus of the character described, an upright shell, a horizontal partition dividing said shell into upper and lower compartments, means within one of said compartments for supporting solid adsorptive material therein for free drainage, a vapor inlet for said compartment, bubble trays contained within the other compartment, a vapor passage connecting said first compartment with the lower portion of said second compartment, a vapor outlet from said second compartment, and means for supplying reflux liquid to the upper portion of said second compartment.

7. In an apparatus of the character described, an upright shell, a horizontal partition dividing said shell into upper and lower compartments, means within one of said compartments for supporting solid absorptive material therein for free drainage, a vapor inlet for said compartment, bubble trays contained within the other compartment, a vapor passage connecting said first compartment with the lower portion of said second compartment, a vapor outlet from said second compartment, means for supplying reflux liquid to the upper portion of said second compartment, and means for draining liquid from said compartments.

8. In an apparatus of the character described, an upright shell, a horizontal partition dividing said shell into upper and lower compartments, means within said upper compartment for supporting solid adsorptive material for free drainage, a fractionating column contained within the lower compartment, a passage leading from said upper compartment to the lower portion of said lower compartment, a vapor inlet for said upper compartment and a vapor outlet for said lower compartment.

9. In an apparatus of the character described, an upright shell, a horizontal partition dividing said shell into upper and lower compartments, means within said upper compartment for supporting solid adsorptive material for free drainage, a fractionating column contained within the lower compartment, a passage leading from said upper compartment to the lower portion of said lower compartment, a vapor inlet for said upper compartment, a vapor outlet for said lower compartment, and means for supplying reflux liquid to the upper part of said lower compartment.

10. In an apparatus of the character described, an upright shell, a partition dividing said shell into upper and lower compartments, means in one of said compartments for supporting solid adsorptive material for free drainage, means for passing vapors upwardly through a body of solid absorptive material supported by said means, a fractionating column in said second compartment, a passage leading from said first to said second compartment, and a vapor outlet from said second compartment.

11. In an apparatus of the character described, an upright shell, a partition dividing said shell into upper and lower compartments, means within one of said compartments for supporting a body of solid adsorptive material for free drainage, means for passing vapors downwardly through said solid absorptive material, a fractionating column contained in the second compartment, a passage leading from the lower part of said upper compartment to the lower part of said lower compartment, and a vapor outlet for said second compartment.

12. In an apparatus of the character described, an upright shell, a partition dividing said shell into upper and lower compartments, means within one of said compartments for supporting a body of solid adsorptive material for free drainage, means for passing vapors downwardly through said solid adsorptive material, a fractionating column contained in the second compartment, a passage leading from the lower part of said upper compartment to the lower part of said lower compartment, a vapor outlet for said second compartment, and means for supplying reflux liquid to the upper part of said second compartment.

13. In an apparatus of the character described, an upright shell, a horizontal partition dividing said shell into upper and lower compartments, means within said upper compartment for supporting a body of solid adsorptive material for free drainage, a fractionating column contained within said lower compartment, a passage leading from the lower portion of said upper compartment to the lower portion of said lower compartment, a passage leading from said upper compartment to the lower portion of said lower compartment, a vapor inlet for said upper compartment, and a vapor outlet for said lower compartment.

14. In an apparatus of the character described, an upright shell, a horizontal partition dividing said shell into upper and lower compartments, means within the lower compartment for supporting a body of solid adsorptive material for free drainage, a fractionating column contained within the upper compartment, a passage leading from the lower compartment to the lower portion of the upper compartment, a vapor inlet for said lower compartment, and a vapor outlet for said upper compartment.

15. In an apparatus of the character described, an upright shell, a partition dividing said shell into upper and lower compartments, means in one of said compartments for supporting solid adsorptive material for free drainage, means for passing vapors downwardly through such solid adsorptive material, a fractionating column in said second compartment, a passage leading from said first to said second compartment, and a vapor outlet from said second compartment.

16. In an apparatus of the character described, an upright shell, a partition dividing said shell into upper and lower compartments, means in one of said compartments for supporting solid adsorptive material for free drainage, means for passing vapors upwardly through such body of such solid adsorptive material, a fractionating column in said second compartment, a passage leading from the upper portion of said first compartment to the lower portion of said second compartment, and a vapor outlet from said second compartment.

17. In an apparatus of the character described, a shell, a partition dividing said shell into two compartments, a passage connecting said compartments, means in one compartment for supporting solid adsorptive material for free drainage, means for directing vapors into indirect heat exchange relation to such solid adsorptive material and then through the same, a fractionating column contained in the other compartment, and a vapor outlet from said last compartment.

18. In an apparatus of the character described, an upright cylindrical shell, a horizontal partition dividing said shell into upper and lower compartments, a cylindrical partition within said lower compartment, said cylindrical partition being supported at its upper end by said horizontal partition and terminating short of the bottom of said shell, thereby forming a central and an annular chamber, means in said central chamber for supporting solid adsorptive material for free drainage, a vapor inlet communicating with the upper portion of said annular chamber, a passage leading from said central chamber to said upper compartment, a fractionating column contained in said upper compartment, and a vapor outlet from said compartment.

In testimony whereof, I have signed my name to this specification.

THOMAS T. GRAY.

DISCLAIMER 1,901,158.—*Thomas T. Gray*, Elizabeth, N. J. REFINING HYDROCARBONS. Patent dated March 14, 1933. Disclaimer filed January 2, 1937, by the assignee, *The Gray Processes Corporation*.

Hereby enters this disclaimer to claims 1 to 7, 10, 14, and 16 of the aforesaid Letters Patent.

[*Official Gazette January 26, 1937.*]